United States Patent
Bruno et al.

(10) Patent No.: US 9,994,323 B2
(45) Date of Patent: Jun. 12, 2018

(54) REPLACEMENT SYSTEM PROVIDING REPLACEMENT AIR TO AN INERTING SYSTEM

(71) Applicant: Hamilton Sundstrand Corporation, Windsor Locks, CT (US)

(72) Inventors: Louis J. Bruno, Ellington, CT (US); Thomas M. Zywiak, Suffield, CT (US); Erin G. Kline, Vernon, CT (US); Christina W. Millot, Wilbraham, MA (US); Harold W Hipsky, Jr., Willington, CT (US); Donald E. Army, Jr., Enfield, CT (US); Paul M. D'Orlando, Simsbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 380 days.

(21) Appl. No.: 14/638,469

(22) Filed: Mar. 4, 2015

(65) Prior Publication Data

US 2016/0257410 A1 Sep. 8, 2016

(51) Int. Cl.
*B64D 13/00* (2006.01)
*B64D 13/08* (2006.01)
(Continued)

(52) U.S. Cl.
CPC ............ *B64D 13/08* (2013.01); *B64D 13/02* (2013.01); *B64D 13/06* (2013.01); *B64D 37/32* (2013.01); *B64D 2013/064* (2013.01); *B64D 2013/0618* (2013.01); *B64D 2013/0648* (2013.01); *Y02T 50/56* (2013.01)

(58) Field of Classification Search
CPC .............................. B64D 13/06; B64D 37/32; B64D 2013/0618; B64D 2013/0648
See application file for complete search history.

(56) References Cited

U.S. PATENT DOCUMENTS

| | | | | |
|---|---|---|---|---|
| 4,262,495 A | * | 4/1981 | Gupta .................... | B64D 13/06 62/172 |
| 5,967,461 A | * | 10/1999 | Farrington ............. | B64D 13/06 244/118.5 |

(Continued)

FOREIGN PATENT DOCUMENTS

| EP | 1445428 A1 | 8/2004 |
|---|---|---|
| GB | 768975 A | 2/1957 |

OTHER PUBLICATIONS

European Search Report Application No. EP 16158495.8-1754 dated Aug. 1, 2016; pp. 12.

*Primary Examiner* — Len Tran
*Assistant Examiner* — Eric Ruppert
(74) *Attorney, Agent, or Firm* — Cantor Colburn LLP (57) ABSTRACT

A replacement system, which includes a plurality of heat exchangers and a compressing device, is configured to prepare in parallel a medium bled from a low-pressure location of an engine and flowing through a plurality of heat exchangers into a chamber. The compressing device is in communication with the plurality of heat exchangers and regulates a pressure of the medium flowing through the plurality of heat exchangers. The replacement system employs a subsystem to treat the medium from the low-pressure location of the engine before it is received by the inerting system.

6 Claims, 6 Drawing Sheets

(51) Int. Cl.
*B64D 13/02* (2006.01)
*B64D 13/06* (2006.01)
*B64D 37/32* (2006.01)

(56) References Cited

U.S. PATENT DOCUMENTS

| | | | | |
|---|---|---|---|---|
| 6,948,325 B1* | 9/2005 | Axe | B64D 13/06 | 62/127 |
| 2004/0025507 A1* | 2/2004 | Leigh | B64D 37/32 | 60/608 |
| 2004/0141836 A1* | 7/2004 | McAuliffe | B64D 13/06 | 415/145 |
| 2005/0247197 A1* | 11/2005 | Snow, Jr. | A62C 3/06 | 95/138 |
| 2007/0004326 A1* | 1/2007 | Haas | B64D 13/06 | 454/71 |
| 2010/0310392 A1* | 12/2010 | Lippold | B64D 13/00 | 417/405 |
| 2013/0139521 A1* | 6/2013 | Massey | B64D 37/32 | 60/782 |
| 2014/0326135 A1 | 11/2014 | Massey et al. | | |

* cited by examiner

REPLACEMENT SYSTEM PROVIDING REPLACEMENT AIR TO AN INERTING SYSTEM

BACKGROUND OF THE INVENTION

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

BRIEF DESCRIPTION OF THE INVENTION

According to one embodiment, a replacement system for replacing a bleed medium flowing to an inerting system is provided. The replacement system comprising a shaft; a compressor configured to compress a chamber medium; a turbine configured to drive the compressor via the shaft; and a heat exchanger configured to reduce a temperature of the chamber medium, wherein a treated medium is produced from the chamber medium by compressing the chamber medium via the compressor and cooling the chamber medium via the heat exchanger, wherein the treated medium replaces the bleed medium flowing from the system to an inerting system.

According to another embodiment, a replacement system comprising a shaft, a compressor, a turbine, and a heat exchanger is provided. The replacement system is configured to condition air from a chamber by compressing the air via the compressor and cooling the air via the heat exchanger to produce conditioned air; and provide the conditioned air in lieu of bleed air flowing from an environmental control system to an inerting system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

A detailed description of one or more embodiments of the disclosed apparatus and method are presented herein by way of exemplification and not limitation with reference to the Figures.

As indicated above, the relatively high pressures provide limited efficiency with respect to engine fuel burn. Thus, what is needed is an environmental control system that provides a medium in parallel across a plurality of heat exchangers to, thus, provide cabin pressurization and cooling at a high engine fuel burn efficiency.

In general, embodiments of the present invention disclosed herein may include an environmental control system comprising a plurality of heat exchangers and a medium flowing through the plurality of heat exchangers, wherein the medium is bled from a low-pressure location of an engine through the plurality of heat exchangers in parallel into a chamber. The low-pressure location of the engine provides the medium at an initial pressure level near a pressure of the medium once it is in the chamber (e.g., chamber pressure). In contrast, conventional systems utilize an initial pressure level that is much greater that the pressure chamber. For example, if a desired chamber pressure is 5 psia, conventional systems will bleed air from a higher pressure location of the engine that provides an initial pressure level at three times the chamber pressure (e.g., 15 psia). Further, the pressure of the medium at the low-pressure location may be slightly above or slightly below the chamber pressure (e.g., any value along the range of 4 to 7 psia when the chamber pressure is 5 psia).

Bleeding the medium at such a low pressure from the low-pressure location causes less of a fuel burn than bleeding air from a higher pressure location. Yet, because the medium is starting at this relatively low initial pressure level and because a drop in pressure occurs over the plurality of heat exchangers, the medium will drop below the chamber pressure while the medium is flowing through the plurality of heat exchangers in series. When the pressure of the medium is below the pressure of the chamber the medium will not flow into the chamber to provide, for example, pressurization and temperature conditioning. Thus, the environmental control system splits a flow of the medium into pieces so that the medium can go into at least two heat exchangers in parallel to reduce the total pressure drop of the medium across the at least two heat exchangers (e.g., parallel cooling provides a minimum pressure drop). With the minimum pressure, the environmental control system can connect and bleed from the low-pressure location. Note that because a temperature of the medium bled from the low-pressure location is significantly lower than a temperature of the medium bled from the high-pressure location, the environmental control system requires less energy to reduce the medium as the medium flows in parallel over the at least two heat exchangers.

Further, in view of this parallel cooling by the environmental control system, a problem arises with respect to an inerting system, which utilizes the medium to operate. An inerting system, in general, decreases a probability of combustion of flammable materials stored in a confined space, such as in the environmental control system, by maintaining a chemically non-reactive or "inert" gas, such as nitrogen, in the confined space. The problem is that because the inerting system generally relies on the medium from the high-pressure location of the engine (e.g., that can be at a pressure greater than 12 psia, such as 35 psia), the inerting system will receive a deficient supply of energy when the low-pressure location of the engine is accessed. To solve this problem, a replacement system can be employed to treat or condition the medium from the low-pressure location of the engine before it is received by the inerting system.

Figure 1:
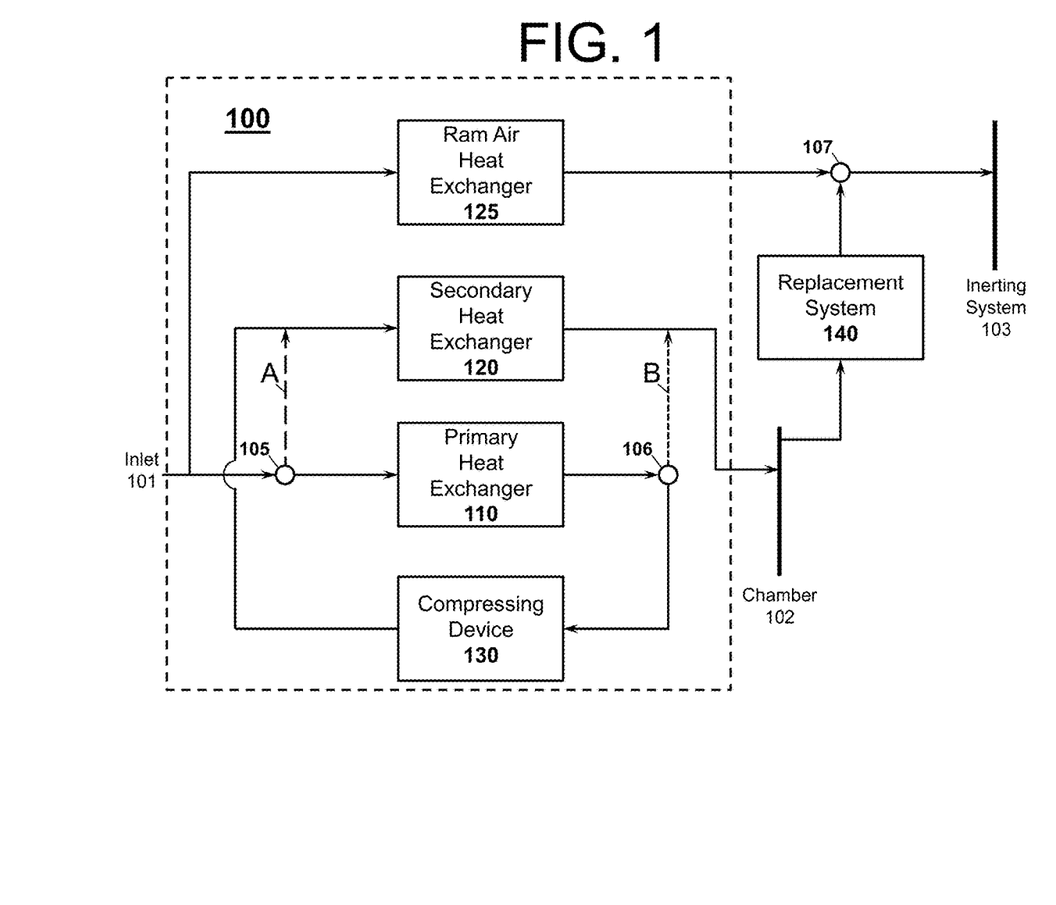
FIG. 1 is a diagram of an schematic of a replacement system in communication with an environmental control system according to an embodiment.

FIG. 1 illustrates an environmental control system 100 with a medium (e.g., air) flowing from an inlet 101 to a chamber 102 and the inerting system though valves 105, 106, 107 a primary heat exchanger 110, a secondary heat exchanger 120, a ram air heat exchanger 125, and a compressing device 130.

In general, the environmental control system 100 supplies a medium to any environment (e.g., chamber 102), thereby providing regulation and/or monitoring of that environment. In one embodiment, the environmental control system 100 is any environmental control system of a vehicle, such as an aircraft, that provides air supply, thermal control, and cabin pressurization for a crew and passengers of the aircraft. Environmental control systems may also include avionics cooling, smoke detection, and/or fire suppression. Further, with respect to the aircraft example, the environmental control system 100 supplies pressurized air (e.g., a medium) to a flight deck of the aircraft (e.g., the chamber 102), for both comfort and pressurization. The air is supplied to the environmental control system 100 at inlet 101 by being "bled" from a compressor stage of an aircraft engine and/or directly from exterior air (e.g., via a ram air system). The temperature and pressure of this "bleed air" varies widely depending upon which compressor stage and a revolutions per minute of the aircraft engine. To achieve the desired temperature, the bleed air is cooled as it is passed through the heat exchangers 110, 120. To achieve the desired pressure, the bleed air is compressed as it is passed through the device 130. Note that the interaction of the environmental control system 100 with the aircraft engine influences how much fuel burn by the aircraft engine is needed to perform operations, such as supplying pressurized air, related to that interaction.

Valves, such as valves 105, 106, 107 are devices that regulate, direct, and/or control a flow of a medium (e.g., gases, liquids, fluidized solids, or slurries, such as bleed air) by opening, closing, or partially obstructing various passageways within the tubes, pipes, etc. of the environmental control system 100. Valves may be operated by actuators such that the flow rates of any medium in any portion of the environmental control system 100 may be regulated to a desired value. For example, the valve 105 enables a flow of the medium from inlet 101 to be divided across the primary heat exchanger 110 and the secondary heat exchanger 120. Further, the valve 106 enables a flow of the medium from the primary heat exchanger 110 to be sent to the compressing device 130 and/or chamber 102, and the valve 107 enables a flow of the medium from either the ram air heat exchanger 125 or a replacement system 140 to be sent to the inerting system 103.

Heat exchangers (e.g., the primary heat exchanger 110, the secondary heat exchanger 120, the ram air heat exchanger 125) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) and/or rammed during flight is blown across the heat exchanger at a variable cooling airflow to control the final air temperature of the bleed air.

The compressing device 130 (e.g., an air cycle machine as described below) is a mechanical device that regulates a pressure of a medium (e.g., increasing the pressure of a gas). Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

In one operation, the environmental control system 100 can bypass the compressing device 130 by activating the valve 106 to divide the flow of the medium from inlet 101 into the primary heat exchanger 110 and the secondary heat exchanger 120 (e.g., arrow A). Both heat exchangers, in turn, cool their respective portions of the medium. Then, the flow of the medium exiting out of the secondary heat exchanger 120 is combined through the activation of valve 106 with flow of the medium exiting out of the primary heat exchanger 110 (e.g., arrow B). This operation may be called a heat exchanger cooling mode that lowers the pressure of the medium near that of the chamber pressure.

Further, FIG. 1 includes the replacement system 140, which may be in communication with (as depicted) or included in an environmental control system, configured to treat the medium from the chamber 102 to produce a treated medium and provide the treated medium to the inerting system 103. That is, the replacement system 140 can provide the treated medium to the inerting system 103 in lieu of bleed air flowing from the environmental control system 100. In this way, the replacement system 140 can resolve the problem that arises with respect to the inerting system 103 during parallel cooling by the environmental control system 100, as further described below.

Figure 2:
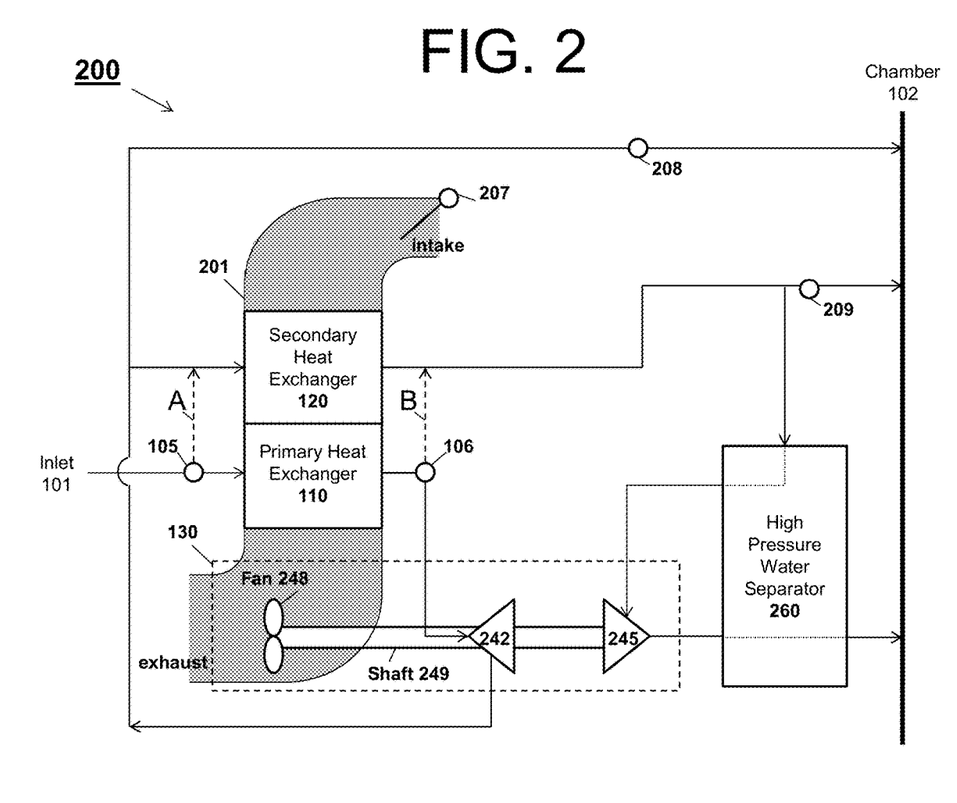
FIG. 2 is operation example of an environmental control system according to an embodiment.

The environmental control system 100 of FIG. 1 will now be described with reference to FIG. 2, in view of the aircraft example above. FIG. 2 illustrates an environmental control system 200 (e.g., an embodiment of the environmental control system 100) that includes, in additional to the previously described items of FIG. 1, a shell 201, valves 207, 208, 209, the compressing device 130 (that includes a compressor 242, a turbine 245, a fan 248, and a shaft 249), and a high pressure water separator 260, each of which are connected via tubes, pipes, ducts and the like, such that bleed air is accepted at the inlet 101 (e.g., high- or low-pressure location of an engine of an aircraft) and provided to the chamber 102 (e.g., cabin, flight deck, etc.).

The environmental control system 200 is an example of an environmental control system of an aircraft that provides air supply, thermal control, and cabin pressurization for the crew and passengers of the aircraft. The shell 201 is an example of a ram chamber of a ram system which uses dynamic air pressure created by an aircraft in motion to increase a static air pressure inside of the shell. Valves 207, 208, 209 are examples of valves described above.

The compressing device 130 can be an air cycle machine that regulates a pressure of a medium (e.g., increasing the pressure of a bleed air). The turbine 245 is a mechanical device that drives the compressor 242 and fan 248 via the shaft 249. The compressor 242 is a mechanical device that compresses the bleed air received from a first heat exchanger (e.g., the primary heat exchanger 110). The fan 248 is a mechanical device that forces via push or pull methods air through the shell 201 across the heat exchangers at a variable cooling airflow. The compressor 242, the turbine 245, and the fan 248 together regulate pressure and illustrate, for example, that the air cycle machine (e.g., the compressing device 130) may operate as a three-wheel air cycle machine. In turn, the three-wheel air cycle machine may include addition of components, such as a power turbine that utilizes exhaust from the chamber 102 to provide additional power to the compressing device 130.

The high pressure water separator 260 is a mechanical device that performs operation of a heat exchanger described above and/or a process of removing water from the bleed air, either temporarily or permanently.

In one operation, bleed air is accepted at inlet 101 from a high-pressure location of an engine of an aircraft at an initial flow rate, pressure (e.g., 35 psia), and temperature that is much greater a final flow rate, pressure (e.g., 12 psia), and temperature. The bleed air is fed through the primary heat exchanger 110, which through cooling lowers the temperature to the compressor 242, which then raises the pressure. Then, due to the valves 208, 209 being closed the bleed air is fed through the secondary heat exchanger 120, which also through cooling lowers the temperature to the high pressure water separator 260. Note that in this operation, the bleed air is fed in series through the primary heat exchanger 110 then the secondary heat exchanger 120.

Figure 3:
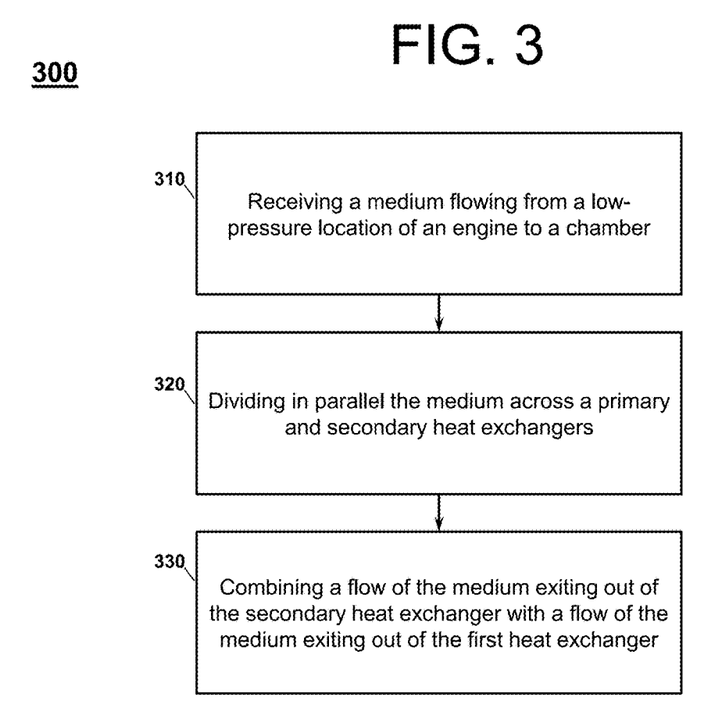
FIG. 3 is example of process flow an environmental control system according to an embodiment.

In another operation, a cooling mode operation may be performed by the environmental control system 200. The cooling mode operation will now be described with respect to FIG. 3. FIG. 3 illustrates a process flow 300 that begins at block 310 where the bleed air is accepted at inlet 101 from a low-pressure location of an engine of an aircraft at an initial flow rate, pressure (e.g., 13 psia), and temperature that is near a final flow rate, pressure, and temperature. Then, at block 320, due to the activation of the valves 105, 106, the bleed air is divided across both the primary heat exchanger 110 and the secondary heat exchanger 120 (e.g., in parallel), such that a first temperature of the bleed air at the valve 105 is collectively reduced to a second temperature that can be at or near a temperature of the chamber 102. That is, the environmental control system 200 can bypass the compressing device 130 by activating the valve 106 to divide a flow of the bleed from inlet 101 into the primary heat exchanger 110 and the secondary heat exchanger 120 (e.g., arrow A). Both heat exchangers, in turn, cool their respective portions of the bleed. Note that by dividing the bleed air in parallel across the heat exchangers 110, 120, which are very high loss components, reduces the pressure drop of the bleed air by half when compared to the one operation above where the bleed air flow flows in series across the heat exchangers 110, 120.

Then, at block 330, a flow of the bleed air exiting out of the secondary heat exchanger 120 is combined through the activation of valve 106 with a flow of the bleed exiting out of the primary heat exchanger 110 (e.g., arrow B). In general, the cooling mode operation may be called a heat exchanger cooling mode that lowers the temperature of the bleed air to that of the chamber pressure. The cooling mode operation may be utilized when ram air cooling for the heat exchangers 110, 120 is adequate (e.g., ram air provides sufficient energy to the heat exchangers 110, 120 to reduce the temperature of the bleed air) and the pressure of the bleed air is high enough to maintain a pressure through the environmental control system 200 without the compressing device 130.

Figure 4:
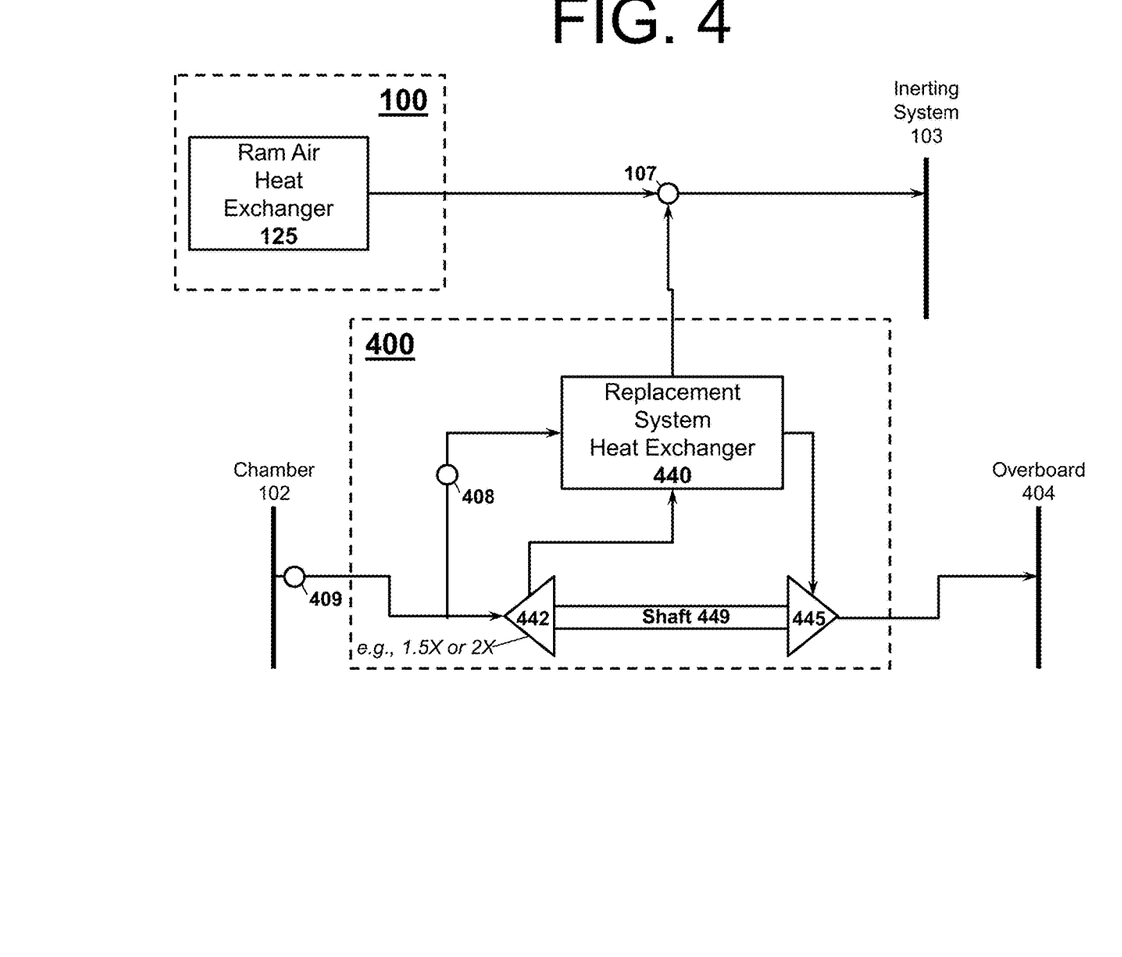
FIG. 4 is another operation example of a replacement system according to an embodiment.

FIG. 4 illustrates a replacement system 400, as an embodiment of the replacement system 140, that receives a medium (or air) from the chamber (e.g., chamber medium). The replacement system 400 also includes valves 408, 409 a replacement system heat exchanger 440, a compressor 442, a turbine 445, and a shaft 449. A first portion of the chamber medium flows to the compressor 442 and a second portion of the chamber medium flows to the replacement system heat exchanger 440. The first portion is treated or conditioned by the compressor 442 and the replacement system heat exchanger 440, such that a treated medium exits from the replacement system heat exchanger 440 and replaces the bleed medium going to the inerting system 103 via the valve 107. The second portion of the chamber medium acts as a heat sink within the replacement system heat exchanger 440 and proceeds overboard 404 through the turbine 445 (e.g., external to the replacement system 400 and/or the environmental control system 100). The replacement system 400 therefore provides the treated medium with a pressure at or above that required by the inerting system 103 (e.g., from 12 psia to 35 psia). Note that, in FIG. 4, the flow of the chamber medium is split between the replacement system heat exchanger 440 and the compressor 442. In this way, the replacement system heat exchanger 440 is upstream of the turbine 445 and downstream of the compressor 442.

Figure 5:
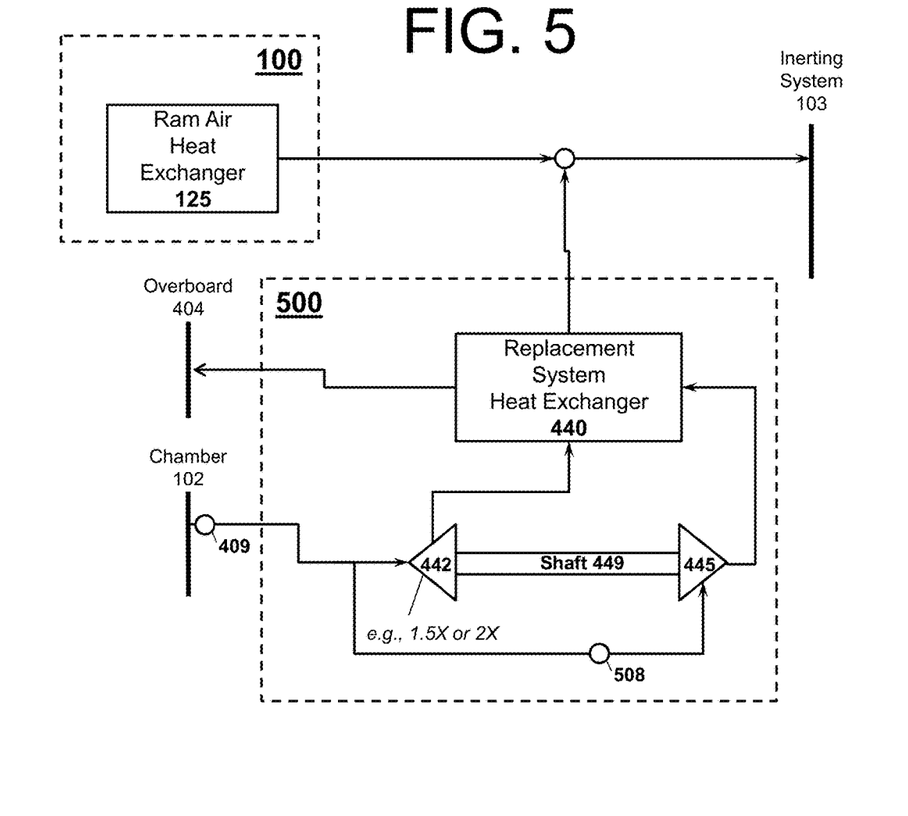
FIG. 5 is another operation example of a replacement system according to an embodiment.
Figure 6:
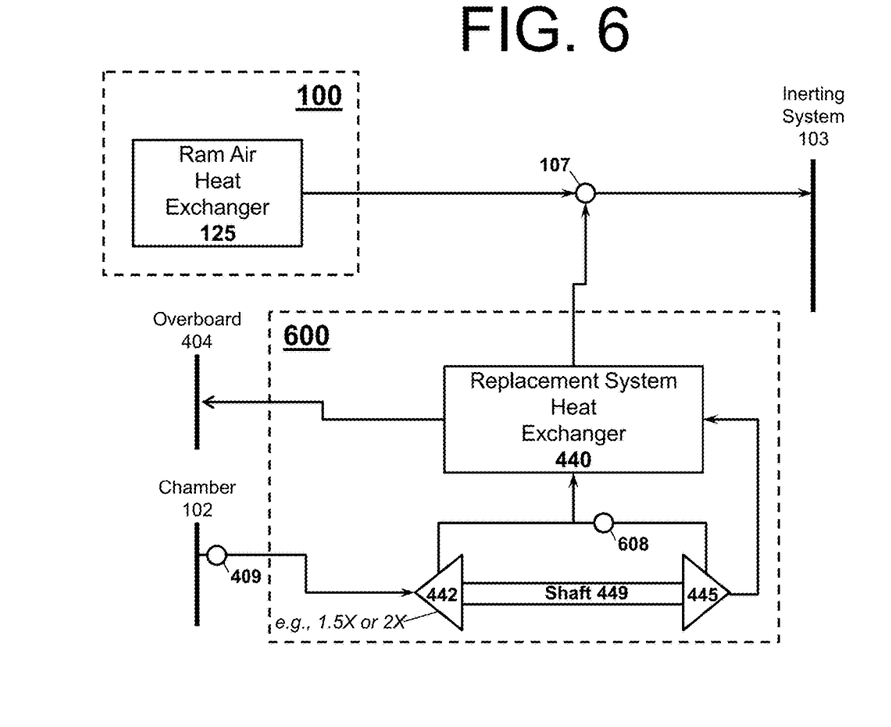
FIG. 6 is another operation example of a replacement system according to an embodiment.

Similarly, FIGS. 5-6 also illustrate replacement systems 500, 600, each of which is an embodiment of subsystem 140 that receive a chamber medium and supply a treated medium instead of the bleed medium via the valve 107 to the inerting system 103. By supplying the treated medium, the replacement systems 500, 600 provide a pressure at or above that required by the inerting system 103 (e.g., from 12 psia to 35 psia). The replacement systems 500, 600 also dump a portion of the chamber medium overboard 404 (e.g., external to the replacement systems 500, 600 and/or the environmental control system 100). The replacement systems 500, 600 respectively include a valve 508 and a valve 608. Note that, in FIG. 5, the flow of the chamber medium is split between the replacement system heat exchanger 440 and the compressor 442. In this way, the replacement system heat exchanger 440 is downstream of the turbine 445 and downstream of the compressor 442. Further, in FIG. 6, the entire flow of the chamber medium compressed by the compressor 442 and the replacement system heat exchanger 440 is downstream of the turbine 445 and the compressor 442.

The valves 408, 409, 508, 608 are examples of valves described above. The replacement system heat exchanger 440, which is a heat exchanger as described above, combines with the compressor 442, the turbine 445, and the shaft 449 to treat, condition, or regulate a pressure, a humidity, and a temperate of the chamber medium. The compressor 442 is a mechanical device that compresses the chamber medium (e.g., by a factor of 1.25×, 1.5×, 1.75×, 2×, or the like). The turbine 445 is a mechanical device that drives the compressor 442 via the shaft 449.

In operation, as shown in FIG. 4, the chamber medium flows through valve 409 into the compressor 442 for compression, through the replacement system heat exchanger 440 for cooling, and out of the replacement system 400 for replacing the bleed medium flowing to the inerting system 103. Further, by activating the valve 408, a portion of the chamber medium can flow through the replacement system heat exchanger 440. This portion of the chamber medium provides a heat sink for cooling the compressed chamber medium flowing through the replacement system heat exchanger 440. Next, as the portion of the chamber medium exhausts from the replacement system heat exchanger 440, it is fed the turbine 445 where it drives the turbine 445 (e.g., and in turn the shaft 449 and compressor 442). That is, the portion of the chamber medium provides hot air into the turbine 445. In this way, the replacement system heat exchanger 440, the compressor 442, the turbine 445, and the shaft 449 perform an operation to compress and cool the chamber medium, which is delivered as the treated medium to replace the bleed medium flowing to the inerting system 100. Note that the operation works in part due to a pressure ratio across the turbine 445. The pressure ratio is X:Y, where X is the pressure of the chamber medium and Y is the ambient pressure. Thus, for example, the pressure ratio across the turbine 442 is created by the pressure of the portion of the chamber medium (e.g., 10 psia) being greater than an ambient pressure at overboard 404 (e.g., 3 psia), which creates a pressure ratio of 3:1 that forces the portion of the chamber medium through the turbine 445.

In another operation, as shown in FIG. 5, the chamber medium flows through valve 409 into the compressor 442 for compression, through the replacement system heat exchanger 440 for cooling, and out of the replacement system 500 for replacing the bleed medium flowing to the inerting system 103. Further, the compressed chamber medium exhausts from the compressor 442 in two portions in two directions. A first portion of the compressed chamber medium can flow in a first direction through the replacement system heat exchanger 440 and out of the replacement system 500 for replacing the bleed medium flowing to the inerting system 103. A second portion of the compressed chamber medium can flow in a second direction through to the turbine 445 by activating the valve 508 and thereby providing energy for the turbine 445 to drive the shaft that powers the compressor 442. Note that as the second portion of the compressed chamber medium exhausts from the turbine 445 (where it also expands), it is fed through the replacement system heat exchanger 440 to overboard 404. The feeding of the exhaust from the turbine 445 through the replacement system heat exchanger 440 provides a heat sink for cooling the compressed chamber medium flowing also through the replacement system heat exchanger 440. Again, note that the operation works in part due to a pressure ratio across the turbine 445 due to the flow of the portion of the compressed chamber medium exhausts from the turbine 445 (where it also expands) to overboard 404.

In another operation, as shown in FIG. 6, the chamber medium flows through valve 409 into the compressor 442 for compression, through the replacement system heat exchanger 440 for cooling, and out of the replacement system 500 for replacing the bleed medium flowing to the inerting system 103. Further, as compressed chamber medium exhausts from the compressor 442, a portion of the compressed chamber medium can flow through to the turbine 445 by activating the valve 608 and thereby providing energy for the turbine 445 to drive the shaft that powers the compressor 442. Next, as the portion of the compressed chamber medium exhausts from the turbine 445 (where it also expands), it is fed through the replacement system heat exchanger 440 to overboard 404. The feeding of the exhausts from the turbine 445 through the replacement system heat exchanger 440 provides a heat sink for cooling the compressed chamber medium flowing also through the replacement system heat exchanger 440. Again, note that the operation works in part due to a pressure ratio across the turbine 445 due to the flow of the portion of the compressed chamber medium exhausts from the turbine 445 (where it also expands) to overboard 404. For example, if the chamber medium of the chamber 102 is at 10 psi, if the compressor 442 increases the pressure of the entire flow by 2x, which results in 20 psi for the chamber medium after the compressor 442, and if the pressure of the ambient air at overboard 404 is 3 psi, then a first portion of the chamber medium is supplied from the compressor 445 downstream to the replacement system heat exchanger 440 at 20 psi while due to the high pressure ratio (e.g., about 6-1 across the turbine 445) a second portion of the chamber medium is supplied from the turbine 445 downstream to the replacement system heat exchanger 440 at a reduced temperature.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An aircraft comprising a bleed medium, an environmental control system, and an inerting system,
    wherein the environmental control system provides the bleed medium to the inerting system,
    wherein the replacement system provides a treated medium to the inerting system in lieu of the bleed medium flowing from the environmental control system to the inerting system,
    wherein the replacement system comprises:
        a shaft;
        a compressor configured to receive and compress a first portion of a chamber medium to produce a compressed medium;
        a turbine configured to receive a second portion of the chamber medium and utilize the second portion of the chamber medium to drive the compressor via the shaft;
        a valve that directs the second portion of the chamber medium to the turbine; and a heat exchanger downstream of the compressed medium flowing from the compressor and downstream of the second portion of the chamber medium flowing from the turbine, the heat exchanger being configured to reduce a temperature of the compressed medium to produce the treated medium, wherein the environmental control system implements a parallel cooling on the bleed medium and the bleed medium is above a chamber pressure of the chamber medium due to the parallel cooling.

2. The replacement system of claim 1, wherein a pressure ratio across the turbine is utilize to drive the turbine, wherein the pressure ratio is between a pressure of the second portion of the chamber medium and an ambient pressure outside the aircraft.

3. The replacement system of claim 1, wherein the valve activates to enable the second portion of the chamber medium to flow through the heat exchanger via the turbine thereby providing a heat sink for cooling the compressed medium flowing through the heat exchanger.

4. The replacement system of claim 1, wherein the chamber is a cabin of the aircraft, wherein the chamber medium is air from the cabin.

5. The replacement system of claim 1, wherein the first portion of the chamber medium flows in a first direction through the compressor, then through the heat exchanger, and then to the inerting system.

6. The replacement system of claim 1, wherein the second portion of the chamber medium flows in a second direction through the turbine, then through the heat exchanger, and then outside the aircraft.

* * * * *